(12) United States Patent
Kawai et al.

(10) Patent No.: US 8,582,055 B2
(45) Date of Patent: Nov. 12, 2013

(54) BACKLIGHT DEVICE AND DISPLAY APPARATUS

(75) Inventors: Noriaki Kawai, Tokyo (JP); Takahisa Kaihotsu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 195 days.

(21) Appl. No.: 13/083,183

(22) Filed: Apr. 8, 2011

(65) Prior Publication Data

US 2012/0105765 A1   May 3, 2012

(30) Foreign Application Priority Data

Oct. 29, 2010   (JP) ................................. 2010-244749

(51) Int. Cl.
*G02F 1/13357* (2006.01)
(52) U.S. Cl.
USPC ............. 349/65; 349/114; 362/613; 362/616; 362/623
(58) Field of Classification Search
USPC ........... 349/15, 62, 64, 65, 68, 114; 362/97.1, 362/97.2, 236, 242, 606, 607, 613, 616, 362/617, 623
See application file for complete search history.

(56) References Cited

U.S. PATENT DOCUMENTS

| 5,956,107 | A  | 9/1999 | Hashimoto et al. |
| 7,154,570 | B2 | 12/2006 | Lee |
| 2004/0135936 | A1 | 7/2004 | Lee |
| 2005/0041184 | A1* | 2/2005 | Wu ................................ 349/114 |
| 2005/0062913 | A1* | 3/2005 | Choi et al. .................... 349/114 |
| 2008/0291152 | A1 | 11/2008 | Nakao et al. |

FOREIGN PATENT DOCUMENTS

| JP | H04-251223 | 9/1992 |
| JP | 10-097199  | 4/1998 |
| JP | 2003-066445 | 3/2003 |
| JP | 2004-118207 | 4/2004 |
| JP | 2008-77946  | 4/2008 |
| JP | 2008-287180 | 11/2008 |

OTHER PUBLICATIONS

Japanese Patent Application No. 2010-244749, Notice of Reasons for Rejection, mailed May 27, 2011, (with English Translation).

* cited by examiner

*Primary Examiner* — Dung Nguyen
*Assistant Examiner* — Tai Duong
(74) *Attorney, Agent, or Firm* — Blakely, Sokoloff, Taylor & Zafman LLP (57) ABSTRACT

A backlight device according to an embodiment includes: first and second light emitting units configured to emit light; and a semi-transmissive reflector placed between the first light emitting unit and the second light emitting unit. The semi-transmissive reflector has a higher reflectance with respect to light incident on a first face facing the first light emitting unit than a reflectance with respect to light incident on a second face facing the second light emitting unit, the semi-transmissive reflector has a higher transmittance with respect to the light incident on the second face than a transmittance with respect to the light incident on the first face.

7 Claims, 5 Drawing Sheets

BACKLIGHT DEVICE AND DISPLAY APPARATUS

CROSS-REFERENCE TO RELATED APPLICATION

This application is based upon and claims the benefit of priority from prior Japanese Patent Application No. 2010-244749 filed on Oct. 29, 2010 in Japan, the entire contents of which are incorporated herein by reference.

FIELD

Embodiments described herein relate generally to a backlight device and a display apparatus with the backlight device.

BACKGROUND

In general, a liquid crystal display apparatus has features such as a small weight, a small thickness, and low power consumption. Therefore, liquid crystal display apparatuses are widely used as display apparatuses for personal computers, portable information terminals, television sets, car navigation systems, and the like. Some liquid crystal display apparatuses are capable of displaying two-dimensional video images and three-dimensional video images.

In a liquid crystal display apparatus, a backlight device is necessary as the light source for illuminating a liquid crystal display panel with light. Depending on the structure of the backlight device, liquid crystal display apparatuses are classified into an edge (side-edge) type and a direct-lighting type.

An edge-type backlight device has light sources at side portions of a light guide plate, and light is emitted from the light sources and is guided by the light guide plate toward the liquid crystal display panel placed in front of the backlight device. A direct-lighting backlight device has light sources behind the liquid crystal display panel when viewed from a viewer.

Among the liquid crystal display apparatuses, there are apparatuses that are capable of displaying video images in display modes with different image qualities, for example. Such apparatuses capable of displaying video images in various display states are required to have backlight devices and display apparatuses that are capable of performing more appropriate backlight control.

DETAILED DESCRIPTION

A backlight device according to an embodiment includes: first and second light emitting units configured to emit light; and a semi-transmissive reflector placed between the first light emitting unit and the second light emitting unit, the semi-transmissive reflector having a higher reflectance with respect to light incident on a first face facing the first light emitting unit than a reflectance with respect to light incident on a second face facing the second light emitting unit, the semi-transmissive reflector having a higher transmittance with respect to the light incident on the second face than a transmittance with respect to the light incident on the first face.

First Embodiment

Figure 1:
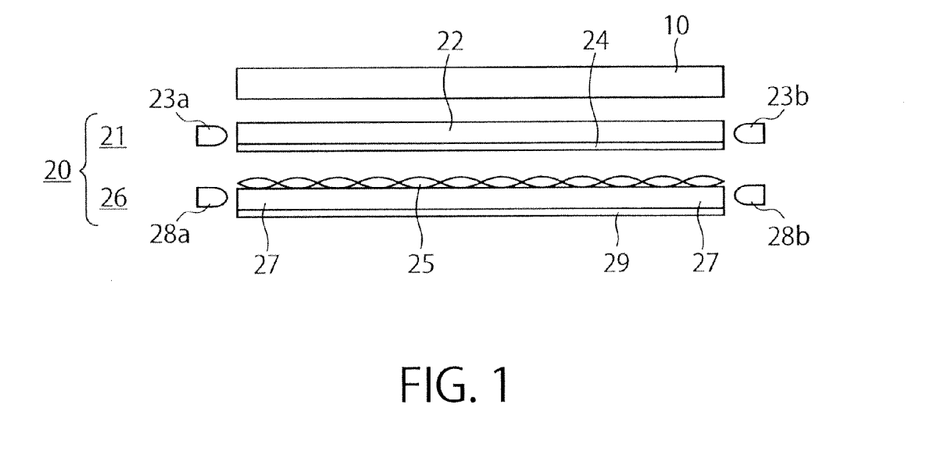
FIG. 1 is a cross-sectional view of a display apparatus according to a first embodiment, viewed from above.

FIG. 1 shows a display apparatus according to a first embodiment. FIG. 1 is a cross-sectional view showing the display apparatus of the first embodiment, viewed from above. The display apparatus of this embodiment includes a liquid crystal display panel 10 and a backlight device 20. The backlight device 20 is used in an edge-type liquid crystal display apparatus, and is placed on the back face side of the liquid crystal display panel 10, or is placed on the opposite side from the viewer (not shown). The backlight device 20 includes a light emitting unit 21, a semi-transmissive reflector 24, a prism sheet 25, a light emitting unit 26, and a reflector 29.

The light emitting unit 21 is placed on the back face side of the liquid crystal display panel 10. The light emitting unit 21 includes a light guide plate 22 and light sources 23a and 23b placed on the side faces (the end faces) of the light guide plate 22. The semi-transmissive reflector 24 is attached to the face of the light guide plate 22 on the opposite side from the face of the light guide plate 22 on which the liquid crystal display panel 10 is placed (or the side opposite from the face facing the liquid crystal display panel 10).

The light emitting unit 26 is placed on the opposite side of the light emitting unit 21 from the side on which the liquid crystal display panel 10 is placed (or the side opposite from the side facing the liquid crystal display panel 10). The light emitting unit 26 includes a light guide plate 27 and light sources 28a and 28b placed on the side faces (the end faces) of the light guide plate 27. The prism sheet 25 is attached to the face of the liquid guide plate 27 on the side on which the light emitting unit 21 is placed (or the side facing the light emitting unit 21). The reflector 29 is entirely or partially attached to the face of the light guide plate 27 on the opposite side of the face to which the prism sheet 25 is attached.

The light guide plates 22 and 27 are made of a transparent material such as a transparent resin, and are shaped into rectangular flat plates. Each end face of the light guide plates 22 and 27 serves as a light incident face through which the light emitted from each corresponding light source enters the light guide plates 22 and 27. As the light sources 23a, 23b, 28a, and 28b, CCFLs (cold cathode fluorescent lamps) or LEDs (light emitting diodes) may be used, for example.

Figure 2:
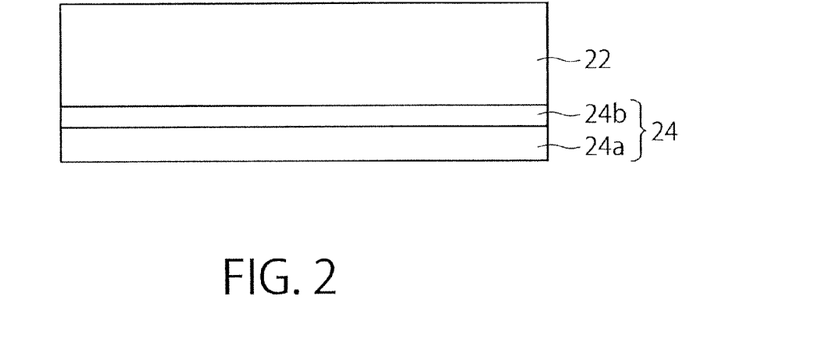
FIG. 2 is a cross-sectional view showing a specific example of a semi-transmissive reflector.

The semi-transmissive reflector 24 reflects light emitted from the light emitting unit 21, and passes light emitted from the light emitting unit 26. That is, light that is emitted from the light sources 23a and 23b and is guided by the light guide plate 22 is reflected, and light that is emitted from the light sources 28a and 28b and is guided by the light guide plate 27 is passed toward the liquid crystal display panel 10. As shown in FIG. 2, the semi-transmissive reflector 24 has a stacked structure that includes a transparent polymer film 24a and a hologram 24b placed between the transparent polymer film 24a and the light guide plate 22. The semi-transmissive reflector 24 is designed so that the reflectance with respect to light emitted from the light emitting unit 21 is higher than the reflectance with respect to light emitted from the light emitting unit 26, and the transmittance with respect to light emitted from the light emitting unit 26 is higher than the transmittance with respect to light emitted from the light emitting unit 21. Although the hologram 24b is formed on one side of the transparent polymer film 24a in FIG. 2, holograms may be formed on both sides of the transparent polymer film 24a. The hologram 24b and the light guide plate 22 may be bonded to each other with an adhesive material.

A transparent, highly chemical-resistant material is preferably used for the transparent polymer film 24a. Examples of such materials include homopolymers or copolymers, such as polyester, polyether, polyarylate, acrylic resin, methacrylic resin, polyolefin, polyvinyl chloride, and polyethersulfone. The film thickness of the transparent polymer film 24a is preferably 10 to 200 μm.

The hologram 24b is formed by recording an image on a photosensitive material such as a photopolymerizable photopolymer. For example, a Lippmann hologram of a volume phase contrast type is used as the hologram 24b.

The prism sheet 25 is an optical sheet that has prisms (such as triangular prisms) placed on both sides and has prismatic characteristics. The respective prisms are arranged to extend in a direction parallel to the light incident faces of the light guide plate 22. The prism sheet 25 is designed to give directivity to light that is reflected by the reflector 29 and passes through the light guide plate 27, so that the light is emitted toward the liquid crystal display panel 10. Instead of the prism sheet 25, it is possible to use an optical sheet that has characteristics of a lens functioning to give directivity to light that is reflected by the reflector 29 and passes through the light guide plate 27 so that the light is emitted toward the liquid crystal display panel 10. The prism sheet 25 is used where the display apparatus is a three-dimensional video display apparatus without glasses as described later, and is used to view a three-dimensional video.

The reflector 29 reflects the light emitted from the light sources 28a and 28b and is guided by the light guide plate 27, toward the liquid crystal display panel 10. A resin sheet containing white pigment, an aluminum reflective sheeting, or a silver reflective sheeting is used as the reflector 29, for example.

Next, operations to be performed by the display apparatus of this embodiment are described.

Figure 3:
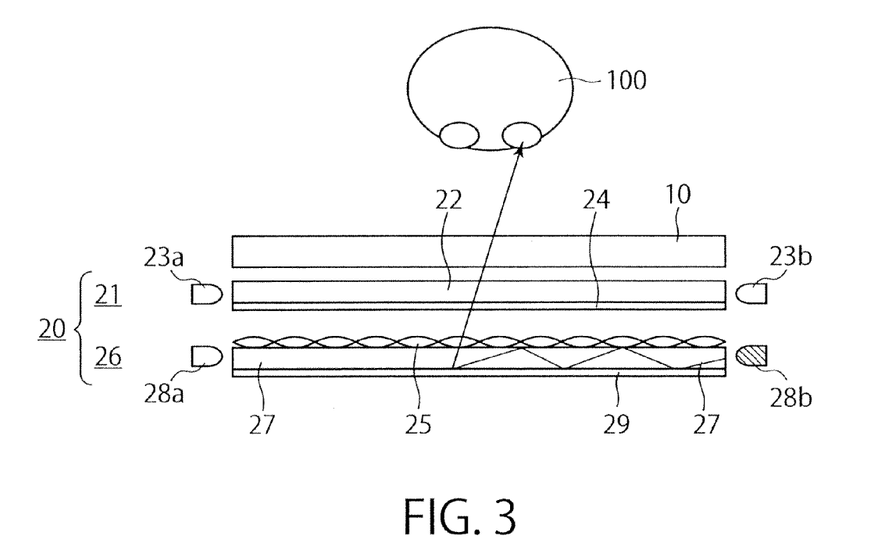
FIG. 3 is a diagram for explaining an operation to be performed when a three-dimensional video is viewed in the first embodiment.
Figure 4:
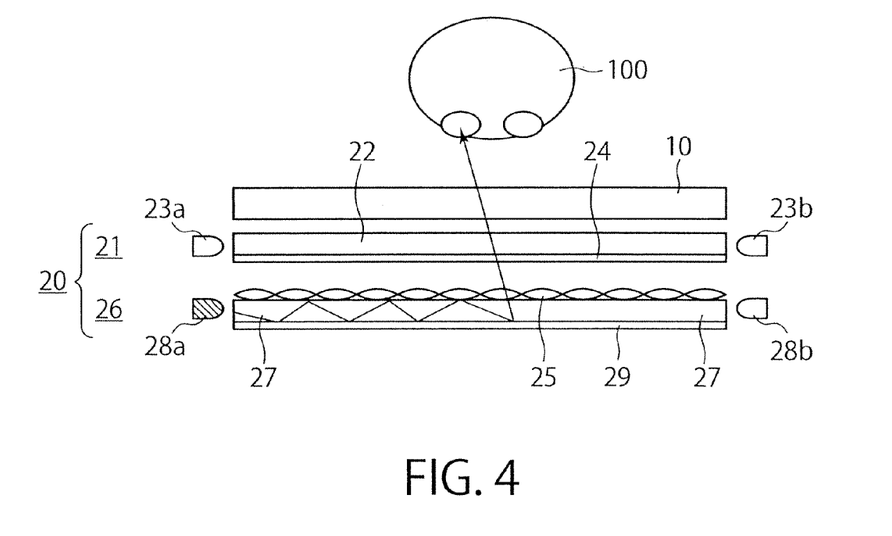
FIG. 4 is a diagram for explaining another operation to be performed when a three-dimensional video is viewed in the first embodiment.

In this embodiment, the light sources 23a and 23b, and the light sources 28a and 28b are switched between an ON state and an OFF state when a two-dimensional video or a three-dimensional video is being viewed. For example, when a three-dimensional video is being viewed, the light emitting unit 26 including the light guide plate 27 and the light sources 28a and 28b is used. That is, the light sources 28a and 28b are put into an ON state (a lighting state), and the light sources 23a and 23b are put into an OFF state (a non-lighting state). As shown in FIGS. 3 and 4, the prism sheet 25 adjusts the angles of light rays so that the light emitted from the light source 28b located on the left side when viewed from a viewer 100 enters the left eye of the viewer 100 (FIG. 3), and the light emitted from the light source 28a located on the right side when viewed from the viewer 100 enters right eye of the viewer 100 (FIG. 4). Since the light rays enter the semi-transmissive reflector 24 located between the light guide plate 22 and the light guide plate 27 from the back face of the semi-transmissive reflector 24, the light emitted from the light emitting unit 26 including the light sources 28a and 28b and the light guide plate 27 passes through the semi-transmissive reflector 24. In this manner, when a three-dimensional video is being viewed, the light emitting unit 26 including the light guide plate 27 and the light sources 28a and 28b is used.

Figure 5:
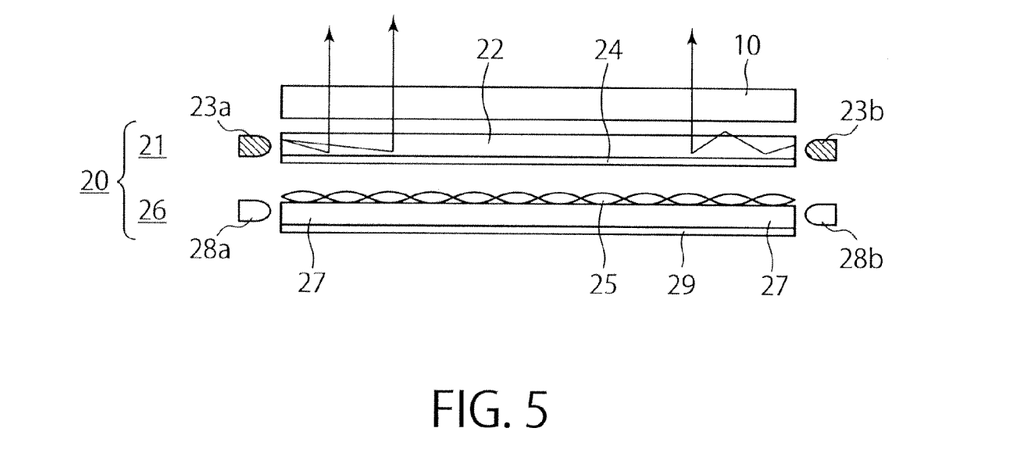
FIG. 5 is a diagram for explaining an operation to be performed when a two-dimensional video is viewed in the first embodiment.

When a two-dimensional video is being viewed, on the other hand, the light emitting unit 21 including the light guide plate 22 and the light sources 23a and 23b is used, as shown in FIG. 5. At this point, the light sources 23a and 23b are in an ON state, and the light sources 28a and 28b are in an OFF state. Since light enters the semi-transmissive reflector 24 located between the light guide plate 22 and the light guide plate 27 from the front face of the semi-transmissive reflector 24, the light emitted from the light emitting unit 21 including the light sources 23a and 23b and the light guide plate 22 is reflected by the semi-transmissive reflector 24. Accordingly, the light emitted from the light emitting unit 21 can be prevented from traveling to the back face or the light emitting unit 26, and light loss can be restrained.

As described above, the display apparatus of this embodiment can be used in a three-dimensional video display apparatus without glasses. In that case, two light emitting units can be separately used, depending on whether a two-dimensional video or a three-dimensional video is being viewed or depending on the display mode selected from different display modes. Accordingly, the more appropriate backlight control for each display mode (each display state) can be performed.

In a three-dimensional video display apparatus without glasses, a parallax barrier (not shown) is normally placed on the front face of the liquid crystal display panel 10 or on the face on the side of the viewer. The three-dimensional video display apparatus without glasses can switch between two-dimensional video viewing and three-dimensional video viewing. In a case where a parallax barrier is placed on the front face of the liquid crystal display panel 10, however, the luminance becomes lower when a two-dimensional video is being viewed than when a three-dimensional video is being viewed.

In this embodiment, on the other hand, the light emitting unit 21 and the light emitting unit 26 are prepared, and the semi-transmissive reflector 24 is placed between the light emitting unit 21 and the light emitting unit 26. The semi-transmissive reflector 24 is designed so that the reflectance with respect to light emitted from the light emitting unit 21 is higher than the reflectance with respect to light emitted from the light emitting unit 26, and the transmittance with respect to light emitted from the light emitting unit 26 is higher than the transmittance with respect to light emitted from the light emitting unit 21. Accordingly, a decrease in luminance can be restrained even when a two-dimensional video is being viewed.

Second Embodiment

Figure 6:
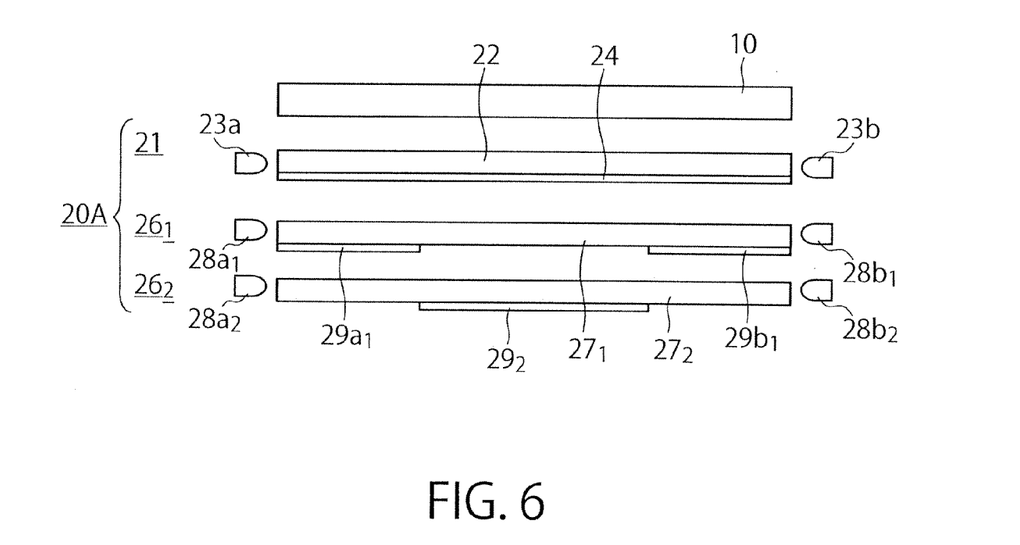
FIG. 6 is a cross-sectional view of a display apparatus according to a second embodiment, viewed from above.

FIG. 6 shows a display apparatus according to a second embodiment. FIG. 6 is a cross-sectional view of the display apparatus of the second embodiment, viewed from above. The display apparatus of this embodiment includes a liquid crystal display panel 10 and a backlight device 20A. The backlight device 20A is the same as the backlight device 20 according to the first embodiment illustrated in FIG. 1, except that the prism sheet 25 is eliminated, the light emitting unit 26 including the light guide plate 27 and the light sources 28a and 28b is replaced with a light emitting unit $26_1$ including a light guide plate $27_1$ and light sources $28a_1$ and $28b_1$ and a light emitting unit $26_2$ including a light guide plate $27_2$ and light sources $28a_2$ and $28b_2$, and the reflector 29 is replaced with reflectors $29a_1$, $29b_1$, and $29_2$. That is, in the second embodiment, the backlight device 20A includes three light emitting units: the light emitting unit 21, the light emitting unit $26_1$, and the light emitting unit $26_2$.

The light emitting unit $26_1$ is placed on the opposite side of the light emitting unit 21 from the side on which the liquid crystal display panel 10 is placed. The light emitting unit $26_1$ includes the light guide plate $27_1$ and the light sources $28a_1$ and $28b_1$ placed on the side faces (the end faces) of the light guide plate $27_1$. The light emitting unit $26_2$ is placed on the opposite side of the light emitting unit $26_1$ from the side on which the light emitting unit 21 is placed. The light emitting unit $26_2$ includes the light guide plate $27_2$ and the light sources $28a_2$ and $28b_2$ placed on the side faces (the end faces) of the light guide plate $27_2$.

The light guide plates $27_1$ and $27_2$ are made of a transparent material such as a transparent resin, and are shaped into rectangular flat plates. Each end face of the light guide plates $27_1$ and $27_2$ serves as a light incident face through which the light emitted from each corresponding light source enters the light guide plates $27_1$ and $27_2$. As the light sources $28a_1$, $28b_1$, $28a_2$, and $28b_2$, CCFLs (cold cathode fluorescent lamps) or LEDs (light emitting diodes) may be used, for example.

The reflectors $29a_1$ and $29b_1$ are placed on both side regions of the face of the light guide plate $27_1$ on the opposite side from the face of the light guide plate $27_1$ on the side on which the light emitting unit 21 is placed. The reflectors $29a_1$ and $29b_1$ reflect the light that is emitted from the light sources $28a_1$ and $28b_1$ and is guided by the light guide plate $27_1$, toward the liquid crystal display panel 10. The reflectors $29_2$ is placed in the center region of the face of the light guide plate $27_2$ on the opposite side from the face of the light guide plate $27_2$ on the side on which the light emitting unit $26_1$ is placed. The reflectors $29_2$ reflects the light that is emitted from the light sources $28a_2$ and $28b_2$ and is guided through the center region of the light guide plate $27_2$, toward the liquid crystal display panel 10.

Next, operations according to this embodiment are described.

In this embodiment, light emission from the light emitting unit 21, the light emitting unit $26_1$, and the light emitting unit $26_2$ is switched on and off, depending on whether locally dimmed viewing or entirely backlit viewing is performed, for example.

Figure 7:
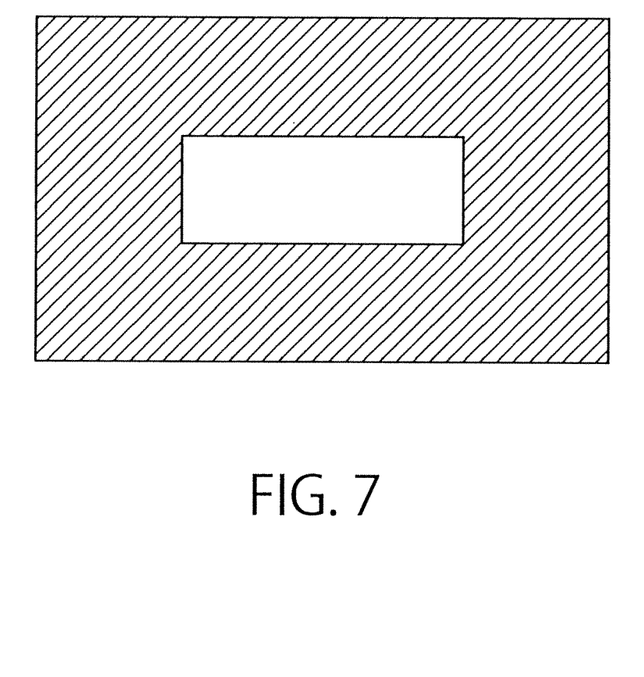
FIG. 7 is a diagram showing a locally dimmed video image displayed on the display apparatus according to the second embodiment.

For locally dimmed viewing, the light sources $28a_1$, $28b_1$, $28a_2$, and $28b_2$ of the light emitting unit $26_1$ and the light emitting unit $26_2$ are used. For example, when the center portion of the liquid crystal display panel 10 is to be lit up as shown in FIG. 7, the light sources $28a_1$ and $28b_1$ of the light emitting unit $26_1$ are put into a lighting state (an ON state), and the light sources $28a_2$ and $28b_2$ of the light emitting unit $26_2$ are put into an OFF state. FIG. 7 shows a video image displayed on the liquid crystal display panel 10 viewed from a viewer (not shown). In this case, light that is reflected by the reflector $29_2$ placed in the center region of the light emitting unit $26_2$ and is emitted from the light emitting unit $26_2$ passes through the center region of the light guide plate $27_1$ of the light emitting unit $26_1$, further passes through the center portion of the semi-transmissive reflector 24, and passes through the center portion of the light guide plate 22 of the light emitting unit 21. As a result, the center portion of the liquid crystal display panel 10 is lit up as shown in FIG. 7.

Figure 8:
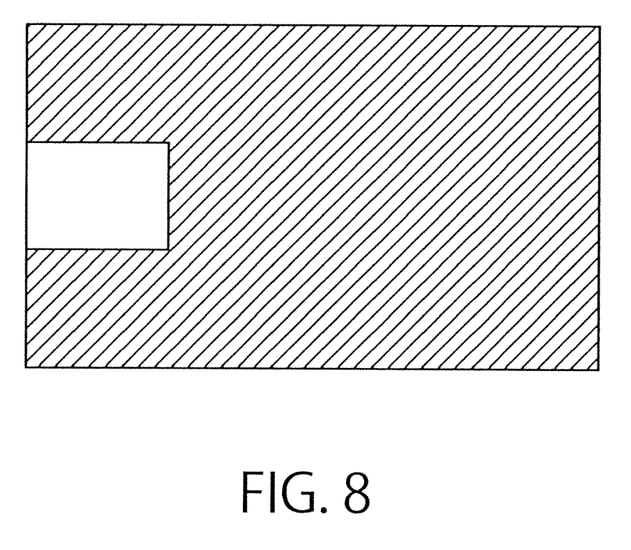
FIG. 8 is a diagram showing another locally dimmed video image displayed on the display apparatus according to the second embodiment.

When a left-end region of the liquid crystal display panel 10 viewed from a viewer is to be lit up as shown in FIG. 8, the left-end light source $28b_1$ of the light emitting unit $26_1$ is switched on, and the light source $28a_1$ is put into a non-lighting state. FIG. 8 shows a video image displayed on the liquid crystal display panel 10 viewed from the viewer (not shown). In this case, light that is emitted from the light source $28b_1$ of the light emitting unit $26_1$ is guided by the light guide plate $27_1$, is reflected by the reflector $29b_1$, and passes through the semi-transmissive reflector 24 and the light guide plate 22. As a result, the left-end region of the liquid crystal display panel 10 is lit up.

In this manner, the third and fourth light emitting units $26_1$ and $26_2$ are used at the time of locally dimmed viewing.

At the time of entirely backlit viewing, on the other hand, the light emitting unit 21 is used. That is, the light sources $28a_1$, $28b_1$, $28a_2$, and $28b_2$ of the light emitting units $26_1$ and $26_2$ are put into an OFF state, and the light sources $23a$ and $23b$ of the light emitting unit 21 are put into an ON state and are then used. In this case, light that is emitted from the light sources $23a$ and $23b$ and is guided by the light guide plate 22 is reflected by the semi-transmissive reflector 24. The light is then emitted from the light emitting unit 21 toward the liquid crystal display panel 10.

One of the reasons that the light emitting units are switched depending on whether locally dimmed viewing or entirely backlit viewing is performed or depending on the display state is that the light sources to be used is reduced in the case of the lower-image-quality mode, and power is saved. In the case of locally dimmed viewing for achieving high image quality, the light source for each area needs to be increased, and the number of light sources to be switched on is large. Accordingly, the power consumption is also large. At the time of entirely backlit viewing, on the other hand, the number of light sources can be made smaller for all images. Therefore, in the lower-image-quality mode, the light emitting unit 21 for entire lighting is used to reduce the power consumption.

As described above, according to this embodiment, light emitting units can be switched, depending on whether locally dimmed viewing or entirely backlit viewing or depending on the display mode selected from different display modes. Accordingly, the more appropriate backlight control for each display state can be performed.

Third Embodiment

Figure 9:
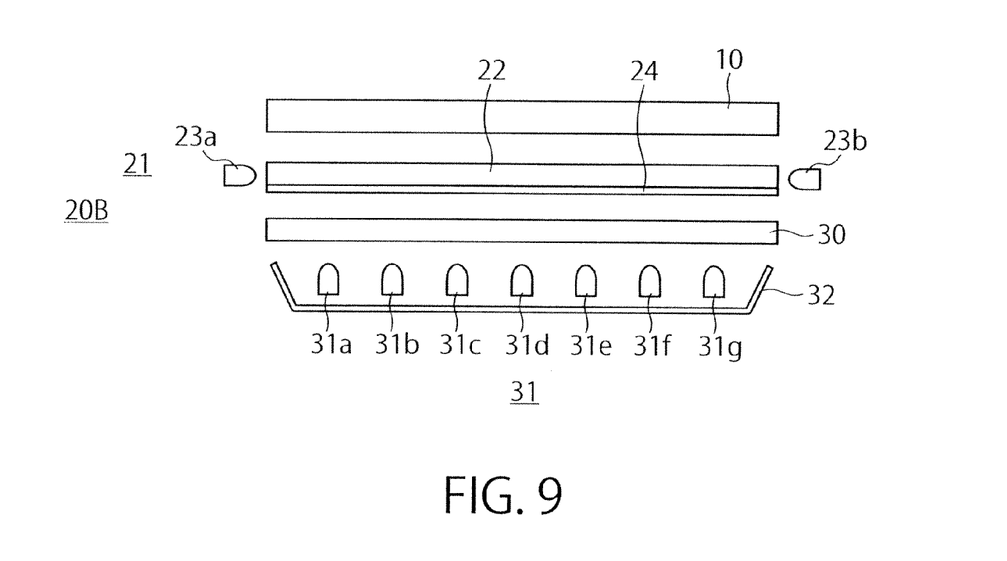
FIG. 9 is a cross-sectional view of a display apparatus according to a third embodiment, viewed from above.

FIG. 9 shows a display apparatus according to a third embodiment. FIG. 9 is a cross-sectional view of the display apparatus according to the third embodiment, viewed from above. The display apparatus of this embodiment includes a liquid crystal display panel 10 and a backlight device 20B. The backlight device 20B includes a light emitting unit 21, a semi-transmissive reflector 24, a diffuser plate 30, a direct-lighting light emitting unit 31 having light sources 31a through 31g, and a reflective plate 32.

Like the light emitting unit 21 of the first embodiment, the light emitting unit 21 is placed on the back face side of the liquid crystal display panel 10. The light emitting unit 21 includes a light guide plate 22 and light sources 23a and 23b placed on the side faces (the end faces) of the light guide plate 22. The semi-transmissive reflector 24 is attached to the face of the light guide plate 22 on the opposite side from the face of the light guide plate 22 on the side on which the liquid crystal display panel 10 is placed. The semi-transmissive reflector 24 has the same functions as those of the semi-transmissive reflector 24 of the first embodiment. That is, the semi-transmissive reflector 24 reflects light emitted from the light emitting unit 21, and passes light emitted from the light emitting unit 31.

The diffuser plate 30 is placed on the opposite side of the light emitting unit 21 from the side on which the liquid crystal display panel 10 is placed. The diffuser plate 30 diffuses local luminance corresponding to the locations of the light sources on the display screen of the liquid crystal display panel 10. Alternatively, the diffuser plate 30 may not be prepared, or may be placed between the liquid crystal display panel 10 and the light guide plate 22.

The light emitting unit 31 is placed on the opposite side of the diffuser plate 30 from the side on which the light emitting unit 21 is placed. The light emitting unit 31 has the light sources 31$a$ through 31$g$ arranged along the face of the diffuser plate 30 on the opposite side from the face of the diffuser plate 30 on the side on which the light emitting unit 21 is placed. As the light sources 31$a$ through 31$g$, CCFLs (cold cathode fluorescent lamps) or LEDs (light emitting diodes) may be used, for example. The light emitting unit 31 can be used at the time of locally dimmed viewing.

The reflective plate 32 is placed on the opposite side of the light emitting unit 31 from the side on which the diffuser plate 30 is placed, and reflects light emitted from the light sources 31$a$ through 31$g$ toward the liquid crystal display panel 10.

In the third embodiment, the light emitting unit 31 can be used at the time of locally dimmed viewing, and the light emitting unit 21 can be used at the time of entirely lit viewing. In this case, in the higher-image-quality mode, the direct-lighting light emitting unit 31 switches on many light sources. In the lower-image-quality mode, the light emitting unit 21 for entire lighting is used. In this manner, the power consumption can be reduced.

In the third embodiment, light emitting units can be switched, depending on the display mode selected from different display modes, as in the second embodiment. Accordingly, the more appropriate backlight control for each display state can be performed.

Fourth Embodiment

Figure 10:
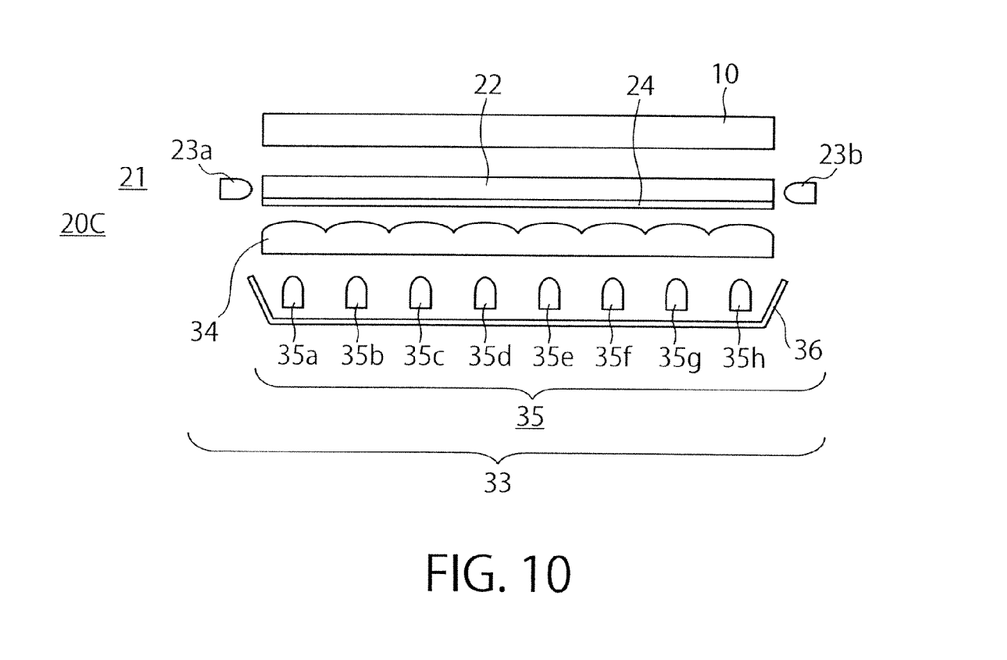
FIG. 10 is a cross-sectional view of a display apparatus according to a fourth embodiment, viewed from above.

FIG. 10 shows a display apparatus according to a fourth embodiment. FIG. 10 is a cross-sectional view of the display apparatus according to the fourth embodiment, viewed from above. The display apparatus of this embodiment includes a liquid crystal display panel 10 and a backlight device 20C. The backlight device 20C includes a light emitting unit 21, a semi-transmissive reflector 24, a light emitting unit 33 that can generate multiple parallaxes, and a reflective plate 36.

Like the light emitting unit 21 of the first embodiment, the light emitting unit 21 is placed on the back face side of the liquid crystal display panel 10. The light emitting unit 21 includes a light guide plate 22 and light sources 23$a$ and 23$b$ placed on the side faces (the end faces) of the light guide plate 22. The semi-transmissive reflector 24 is attached to the face of the light guide plate 22 on the opposite side from the face of the light guide plate 22 on the side on which the liquid crystal display panel 10 is placed. The semi-transmissive reflector 24 has the same functions as those of the semi-transmissive reflector 24 of the first embodiment. That is, the semi-transmissive reflector 24 reflects light emitted from the light emitting unit 21, and passes light emitted from the light emitting unit 33.

The light emitting unit 33 is placed on the opposite side of the light emitting unit 21 from the side on which the liquid crystal display unit 10 is placed. The light emitting unit 33 includes a light ray controller 34 and a light source unit 35. The light ray controller 34 is formed by parallax barriers that control light rays emitted from the light source unit 35. As the light ray controller 34, a cylindrical-lens array (a lenticular sheet) with cylindrical lenses extending parallel to one another, a pin-hole array, a lens array, or the like is used. In this embodiment illustrated in FIG. 10, cylindrical lenses are used. The light source unit 35 is placed on the opposite side of the light ray controller 34 from the side on which the light emitting unit 21 is placed. The light source unit 35 includes light sources 35$a$, 35$b$, 35$c$, 35$d$, 35$e$, 35$f$, 35$g$, and 35$h$ that extend in the direction in which the parallax barriers are arranged, or along the respective edge lines of the cylindrical lenses. That is, each of the light sources 35$a$, 35$b$, 35$c$, 35$d$, 35$e$, 35$f$, 35$g$, and 35$h$ is placed along the edge line of each corresponding cylindrical lens. Accordingly, the light emitting unit 33 emits multi-parallax light having directivity. In this embodiment, each of the light sources 35$a$, 35$b$, 35$c$, 35$d$, 35$e$, 35$f$, 35$g$, and 35$h$ is placed along the edge line of each corresponding cylindrical lens. However, each of the light sources 35$a$, 35$b$, 35$c$, 35$d$, 35$e$, 35$f$, 35$g$, and 35$h$ may be tilted with respect to the edge line of each corresponding cylindrical lens.

The reflective plate 36 is placed on the opposite side of the light emitting unit 33 from the side on which the light emitting unit 21 is placed. The reflective plate 36 reflects light emitted from the light sources 35$a$ through 35$h$ toward the liquid crystal display panel 10.

In this embodiment having the above described structure, the display apparatus can be used for a glasses-free, three-dimensional video display apparatus. In such a case, the light emitting unit 33, not the light emitting unit 21, is used when a three-dimensional video is being viewed. When a two-dimensional video is being viewed, the light emitting unit 21 is used, but the light emitting unit 33 is not used. That is, light emitting units are separately used, depending on whether a three-dimensional video or a two-dimensional video is being viewed. Accordingly, the power consumption can be reduced.

In a three-dimensional video display apparatus without glasses, a parallax barrier (not shown) is normally placed on the front face of the liquid crystal display panel 10 or on the face on the side of the viewer. The three-dimensional video display apparatus without glasses can switch between two-dimensional video viewing and three-dimensional video viewing. In a case where a parallax barrier is placed on the front face of the liquid crystal display panel 10, however, the luminance becomes lower when a two-dimensional video is being viewed than when a three-dimensional video is being viewed.

In this embodiment, on the other hand, the semi-transmissive reflector 24 is used, and accordingly, a decrease in luminance can be restrained even when a two-dimensional video is being viewed, as in the first embodiment.

As described above, in the fourth embodiment, light emitting units can be switched, depending on the display mode selected from different display modes, as in the first embodiment. Accordingly, the more appropriate backlight control for each display state can be performed.

In the first through fourth embodiments, light emitting units are separately used, depending on the display state. Accordingly, optical properties can be selectively utilized.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A backlight device comprising:
a first light emitting unit configured to emit light and including a first light guide plate and a pair of first light sources placed on both end faces of the first light guide plate;
a second light emitting unit configured to emit light and including a second light guide plate and a pair of second light sources placed on both end faces of the second light guide plate;
a third light emitting unit configured to emit light and being placed on an opposite side of the second light emitting unit from the first light emitting unit, the third light emitting unit including a third light guide plate and a pair of third light sources placed on both end faces of the third light guide plate;
a first reflector placed in either side region of a face of the second light guide plate on an opposite side from the first light emitting unit;
a second reflector placed in a center region of a face of the third light guide plate on an opposite side from the second light emitting unit; and
a semi-transmissive reflector placed between the first light emitting unit and the second light emitting unit, the semi-transmissive reflector having a higher reflectance with respect to light incident on a first face facing the first light emitting unit than a reflectance with respect to light incident on a second face facing the second light emitting unit, the semi-transmissive reflector having a higher transmittance with respect to the light incident on the second face than a transmittance with respect to the light incident on the first face.

2. The backlight device according to claim 1, wherein one of the first light emitting unit and the second light emitting unit does not emit light when the other one of the first light emitting unit and the second light emitting unit emits light.

3. A display apparatus comprising:
a backlight device including
a first light emitting unit configured to emit light and including a first light guide plate and a pair of first light sources placed on both end faces of the first light guide plate,
a second light emitting unit configured to emit light and including a second light guide plate and a pair of second light sources placed on both end faces of the second light guide plate,
a third light emitting unit configured to emit light and being placed on an opposite side of the second light emitting unit from the first light emitting unit, the third light emitting unit including a third light guide plate and a pair of third light sources placed on both end faces of the third light guide plate,
a first reflector placed in either side region of a face of the second light guide plate on an opposite side from the first light emitting unit,
a second reflector placed in a center region of a face of the third light guide plate on an opposite side from the second light emitting unit, and
a semi-transmissive reflector placed between the first light emitting unit and the second light emitting unit, the semi-transmissive reflector having a higher reflectance with respect to light incident on a first face facing the first light emitting unit than a reflectance with respect to light incident on a second face facing the second light emitting unit, the semi-transmissive reflector having a higher transmittance with respect to the light incident on the second face than a transmittance with respect to the light incident on the first face; and
a liquid crystal display panel placed on the opposite side of the first light emitting unit from the second light emitting unit.

4. The display apparatus of claim 3, wherein one of the first light emitting unit and the second light emitting unit does not emit light when the other one of the first light emitting unit and the second light emitting unit emits light.

5. A backlight device comprising:
a first light emitting unit including a first light guide plate and a first plurality of light sources at least placed on both end faces of the first light guide plate;
a second light emitting unit including a second light guide plate and a second plurality of light sources at least placed on both end faces of the second light guide plate;
a third light emitting unit being placed on an opposite side of the second light emitting unit from the first light emitting unit, the third light emitting unit including a third light guide plate and a third plurality of light sources at least placed on both end faces of the third light guide plate;
a first reflector placed in either side region of a face of the second light guide plate on an opposite side from the first light emitting unit;
a second reflector placed in a center region of a face of the third light guide plate on an opposite side from the second light emitting unit; and
a semi-transmissive reflector placed between the first light emitting unit and the second light emitting unit, the semi-transmissive reflector including a higher reflectance with respect to light incident on a first face facing the first light emitting unit than a reflectance with respect to light incident on a second face facing the second light emitting unit, the semi-transmissive reflector including a higher transmittance with respect to the light incident on the second face than a transmittance with respect to the light incident on the first face.

6. The backlight device according to claim 5, wherein the first light emitting unit does not emit light when the second light emitting unit emits light.

7. The backlight device according to claim 5, wherein the second light emitting unit does not emit light when the first light emitting unit emits light.

* * * * *